June 12, 1962 C. W. PINKLEY 3,039,049
NUCLEAR MAGNETIC RESONANCE MEASURING AND CONTROL DEVICE
Filed Aug. 5, 1958 2 Sheets-Sheet 1

INVENTOR
Clyde W. Pinkley
Anthony D. Cennamo

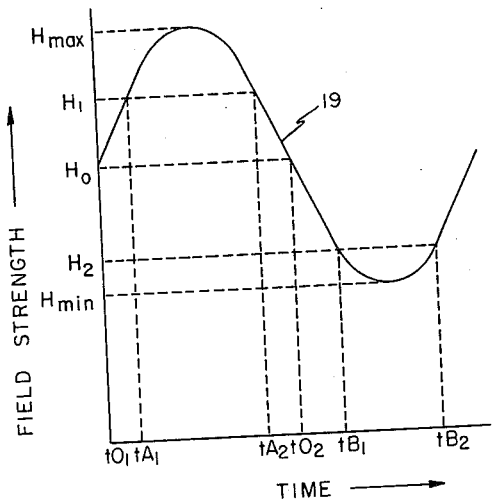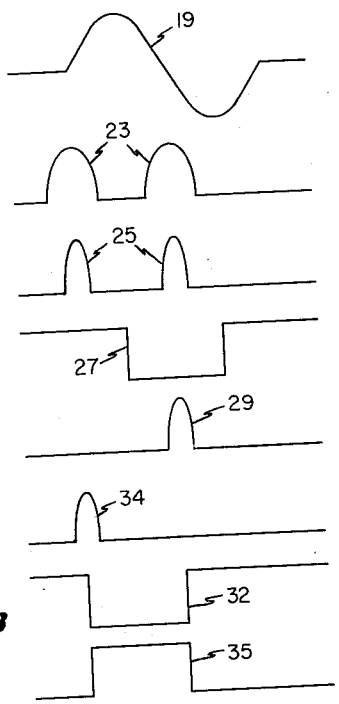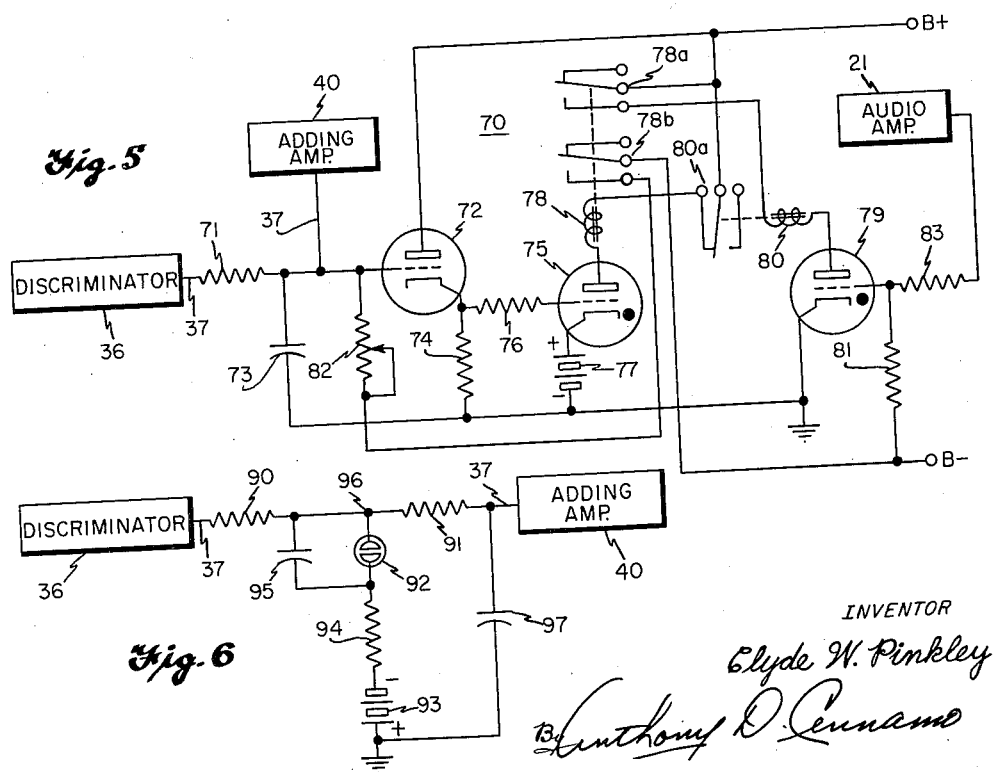

United States Patent Office 3,039,049
Patented June 12, 1962

3,039,049
NUCLEAR MAGNETIC RESONANCE MEASURING AND CONTROL DEVICE
Clyde W. Pinkley, 58 N. Washington Ave., Columbus, Ohio
Filed Aug. 5, 1958, Ser. No. 753,378
7 Claims. (Cl. 324—.5)

This is a continuation-in-part of application Serial No. 710,043, filed January 20, 1958, for Nuclear Magnetic Resonance Measuring and Control Device, now U.S. Patent No. 2,960,650, issued November 15, 1960.

This invention relates to nuclear magnetic resonance measuring and control devices, and in particular to new and improved apparatus for automatically controlling the relative relationship between the magnetic and radio-frequency fields of such devices so as to satisfy the requirements for nuclear resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil.

When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil.

The radio-frequency field, or the magnetic field, is modulated at a slow audio rate. When the radio-frequency and the magnetic fields satisfy the relation $W=\gamma H$, where "$W$" is the angular velocity of the radio-frequency field, "$H$" is the permanent magnetic field strength in gausses, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec.$^{-1}$ gausses$^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of moisture present so that a quantitative measurement can be made.

The use of the nuclear magnetic resonance phenomenon in the measurement and control of the moisture content of various materials requires precise functioning of the measuring apparatus. In the event the required relationship between magnetic field intensity and the frequency of the radio-frequency field is not maintained, loss of resonance will render the measurement and control functions ineffective. Loss of resonance can occur as a result of excessive variations in the intensity of the magnetic field, changes in the magnetic flux path, or through drift in the frequency of the radio-frequency field.

Accordingly, a principal object of this invention is to improve the reliability of nuclear magnetic resonance measuring and control devices by preventing loss of resonance with respect to a particular nucleus under test.

Another object is to provide improved nuclear magnetic resonance apparatus by controlling the frequency of the radio-frequency field in response to the intensity of the magnetic field.

Another object is to provide an electronic feedback control for attaining the foregoing objects that does not depend on the linear characteristics of vacuum tubes or transistors and therefore is stable for changes in tube characteristics, supply voltage changes and component replacement.

Another object is to improve the ease of operation of nuclear magnetic resonance apparatus by automatically adjusting for a condition of resonance.

Another object is to improve the operation of electronic feedback apparatus for maintaining nuclear magnetic resonance by causing such apparatus to adjust automatically for a condition of resonance.

The invention may be associated with most of the magnet and coil assemblies employed in the prior art for generating the transverse magnetic and radio-frequency fields required for nuclear magnetic resonance measurements. In these equipments, a constant-current, radio-frequency oscillator is usually employed to energize the coil, and modulation coils may be coupled to the magnet so that the magnetic field is amplitude modulated at a slow rate. As the magnetic field periodically sweeps through the intensity value required to produce a condition of resonance for the frequency of radio-frequency field, the nuclei under test absorb energy.

A principal feature of this invention relates to a feedback network interconnecting a measurement readout circuit and the radio-frequency oscillator so that a condition of nuclear resonance can be maintained through continuous satisfaction of the relationship $W=\gamma H$. The feedback network controls the time relationship between the periodic occurrence of resonance and the start of each modulation cycle. In a preferred mode of operation, the radio-frequency is set so that nuclear resonance occurs at the start of each modulation half cycle.

Another principal feature of this invention relates to a resonance seeking circuit that is associated with the foregoing feedback network so as to operate automatically when the feedback circuit is not in control. The resonance seeking circuit sweeps a radio-frequency source through a range of frequencies encompassing the resonant frequencies and enables the feedback circuit to come into operation and regain control over the output frequency of the radio-frequency source. The radio-frequency source is thus controlled to seek resonance, and also to prevent loss of resonance once resonance is attained.

In order that all of the features for attaining the objects of this invention may be readily understood, reference is herein made to the drawings wherein:

FIG. 2 is a graph showing a constant magnetic field modulated by a single alternating-current cycle;

FIG. 3 is a group of waveforms generated in the circuit of FIG. 1 and associated timewise with the modulation curve of FIG. 2;

FIG. 5 is a schematic circuit diagram of a first embodiment of a resonance seeking circuit that may be advantageously associated with the apparatus of FIGS. 1 and 4; and FIG. 6 is a schematic circuit diagram of a second embodiment of a resonance seeking circuit.

Figure 1:
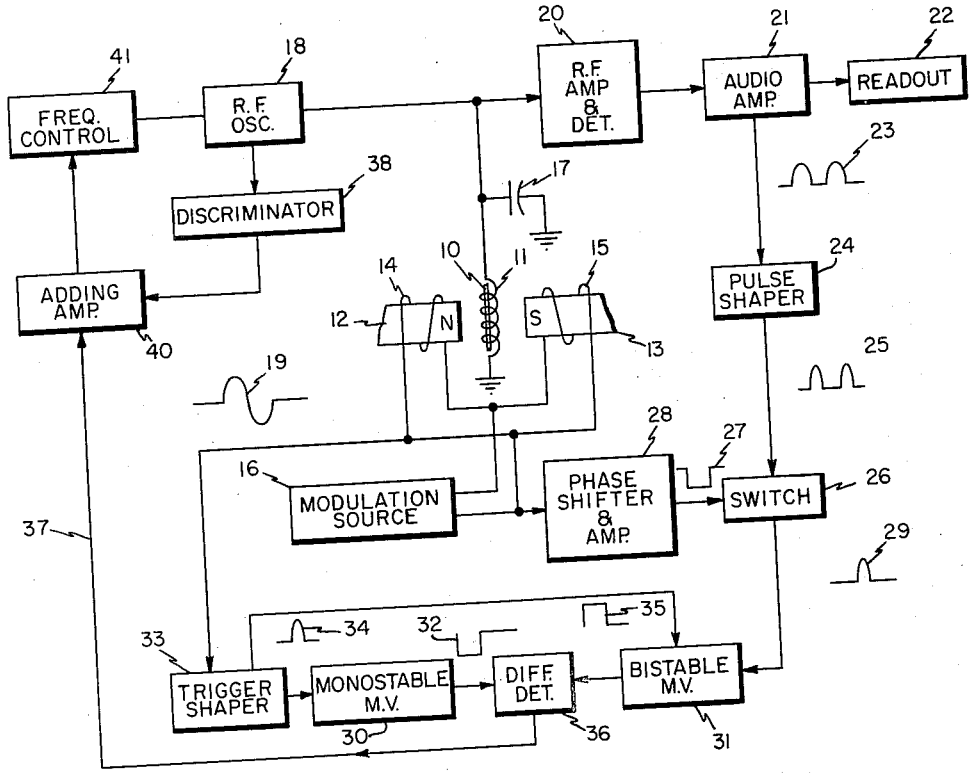
FIG. 1 is a block diagram of nuclear resonance measuring apparatus employing the feedback control of this invention.

Referring now to FIG. 1, material 10 under moisture test is positioned in the interior of radio-frequency sampling coil 11, and is thereby subjected to a radio-frequency field parallel to the longitudinal axis of coil 11. Material 10 is also subjected to a transverse magnetic field developed in the gap between permanent magnets 12 and 13. Modulating coils 14 and 15 envelope the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel resonant tank circuit connected to the output of constant-current, radio-frequency oscillator 18. The tank circuit is tuned to the oscillator frequency, and therefore a substantial radio-frequency voltage appears across the combination 11—17. This voltage has a constant amplitude except during those periodic instances at which the output frequency of oscillator 18 and the modulated magnetic field generated by magnets 12 and 13 and modulation coils 14 and 15 satisfy the requirements for nuclear resonance.

During resonance, the moisture of material 10 absorbs energy from the radio-frequency field so as to periodically load coil 11. As is well known, the loading of a parallel resonant tank circuit lowers the Q of the tank, thereby reducing the parallel impedance and the voltage appearing across the tank. The periodic absorption of energy by material 10 amplitude modulates the radio-frequency voltage appearing across tank circuit 11—17. The amplitude of this modulation component varies in accordance with the number of nuclei present to absorb energy from tank coil 11. In the case of moisture measurements, the hydrogen nucleus is caused to resonate, and the energy absorbed is proportional to the moisture content of the test sample. In the event material 10 is a moving web or cord, moisture variations in the sampled portion will cause corresponding changes in the energy absorption.

The voltage appearing across tank circuit 11—17 is applied to the input of radio-frequency amplifier and detector 20. The output of unit 20 is in turn applied to the input of audio-amplifier 21 which has an output connected to readout means 22. In a typical installation, readout means 22 may be an oscilloscope in which the vertical amplifier input terminals are connected to audio-amplifier 21, and the oscilloscope sweep is synchronized by the audio-frequency voltage generated from modulation source 16. This arrangement, therefore, produces a fixed pulse on the oscilloscope screen that varies in amplitude in accordance with any moisture variations in the material 10 under test.

Referring now to FIGS. 2 and 3, the magnetic field strength in the gap between magnets 12 and 13 is plotted for a single cycle of the modulation signal 19 generated by source 16. The field intensity of the steady magnetic field is indicated by the ordinate H. This steady magnetic field is amplitude modulated at a low audio-frequency having an amplitude that varies sinusoidally in accordance with the curve 19. The maximum and minimum amplitudes for the magnetic field are indicated by the ordinates H max. and H min.

Two voltage pulses 23 (FIG. 3) are obtained at the output of audio-amplifier 21 during each modulation cycle at times $tO_1$ and $tO_2$ when $W=\gamma H$. If the frequency of the radio-frequency field is increased slightly and the magnetic field is defined by curve 19, resonance will still occur, however, at times $tA_1$ and $tA_2$. At these times, the fields have the relationship $W_1=\gamma H_1$. A slight decrease in radio-frequency causes resonance to occur at times $tB_1$ and $tB_2$ when the fields have the relationship $W_2=\gamma H_2$.

Resonance will not occur if the radio-frequency exceeds the resonance frequency $$\frac{\gamma}{2\pi} H \text{ max.}$$

or if the frequency is less than the resonance frequency $$\frac{\gamma}{2\pi} H \text{ min.}$$

The invention herein features a feedback network that maintains the output of oscillator 18 within the required resonance frequency range for variations in magnetic intensity deviating from curve 19. This feedback network operates on the principle of maintaining the time between voltage pulses appearing at the output of audio amplifier 21 to one-half of the period of the modulation cycle. Referring to the block diagram shown in FIG. 1 and the waveforms shown in FIG. 3, the feedback network operates in the following manner.

Frequency error is defined as the difference between the output frequency of radio-frequency oscillator 18 and the frequency at which $W=\gamma H$. Direct-current error is defined as the direct-current voltage developed in the feedback network which is proportional to the frequency error.

The voltage pulse output 23 of the audio amplifier 21 is fed to a pulse shaper 24 which shapes, amplifies, and eliminates noise thereby generating sharp pulses 25 coincident with the audio output 23. The pulses 25 are gated in an electronic switching unit 26. This switch is supplied with a gating square wave 27 developed from the modulation voltage of source 16 and shifted in phase 90° by phase shifter and amplifier unit 28.

The output of switch 26 therefore separates the two pulses 25 and generates one pulse 29 per modulation cycle. This pulse 29 is coincident with one of the pulses 25. The time at which pulse 29 occurs, with respect to the start of a modulation cycle, varies from ¼ to ¾ of the modulation period depending on the frequency error, and will equal ½ of the modulation period when there is no frequency error.

A frequency error voltage is generated by time discrimination means that is responsive to the time separation between actual pulse 29 and the time of a pulse 29 generated by the relationship $W=\gamma H$. This discrimination means operates upon the principle of area detection and the comparison of two square waves. In particular, a monostable multivibrator 30 and a bistable multivibrator 31 are triggered at the start of each modulation cycle 19 by a trigger pulse 34 generated by trigger shaper 33.

The output of the monostable multivibrator 30 is a square wave 32 commencing at the start of each modulation cycle 19 and having a fixed time duration equal to one-half of the modulation period. Square wave 32 is employed as a reference waveform as is hereinafter set forth.

The bistable multivibrator 31 generates a square wave output 35 having the same amplitude as square wave 32 but with an opposite polarity. The duration of square wave 35 is dependent on the frequency error. In particular, the front edge of this square wave is coincident with the start of the modulation cycle 19 and the trailing edge is coincident with the gated pulse 29 present at the output of electronic switch 26. The outputs of the two multivibrators 30 and 31 are integrated and compared in a difference detector 36. A direct-current voltage proportional to the frequency error is applied to conductor 37 as the output of the detector.

In order to achieve long term stability in the measuring device of this invention, the output of radio-frequency oscillator 18 is applied to a discriminator 38 that generates a direct-current voltage proportional to the frequency of the energy applied thereto. This direct-current voltage is added in amplifier 40 to the direct-current error voltage generated by the difference detector 36. The resulting output of adding amplifier 40 is applied to a reactance tube within frequency control 41, thereby adjusting the frequency of the radio-frequency oscillator 18 so that pulses 23 assume a time spacing equal to one-half of the modulation cycle 19.

The feedback system herein described does not depend on the linear characteristics of vacuum tubes or resistors and is therefore stable for changes in tube characteristics, supply voltage changes, and component replacements.

Additionally, the basic feedback arrangement is applicable to alternate methods for achieving frequency control. For example, a direct-current selsyn or syncro-converter may be driven by the direct-current error voltage so that a variable capacitor in the radio-frequency oscillator or a potentiometer controlling the input voltage to a reactance tube may be appropriately controlled to effect the necessary frequency changes.

In another alternative arrangement, an amplifier driven to cut off and saturation by the modulating voltage 19 may be employed to generate the reference square wave 35 in lieu of the trigger shaper 34 and monostable multivibrator 30.

A prefererd schematic circuit embodiment for difference detector 36 is shown in FIG. 3. In this circuit arrangement, the reference square wave 32 generated by monostable multivibrator 30 is applied between input terminal 50 and ground, and the variable time square wave 35 generated by bistable multivibrator 31 is applied between input terminal 51 and ground. The reference square wave 32 is applied through blocking capacitor 56 to a filter circuit including half-wave rectifier 52, capacitor 53, resistor 54 and capacitor 55. The variable time square wave 35 is applied through blocking capacitor 63 to a filter circuit including half-wave rectifier 60, capacitor 61, resistor 62 and capacitor 55.

It should be noted, that inasmuch as half-wave rectifiers 52 and 60 are poled in opposite directions, the difference of the two voltages applied to the half-wave rectifiers is integrated in common capacitor 55. The voltage appearing across common capacitor 55 is applied to conductor 37 as the direct-current error output voltage. Resistors 64 and 65 provide discharge leakage paths for blocking capacitors 56 and 63.

Figure 4:
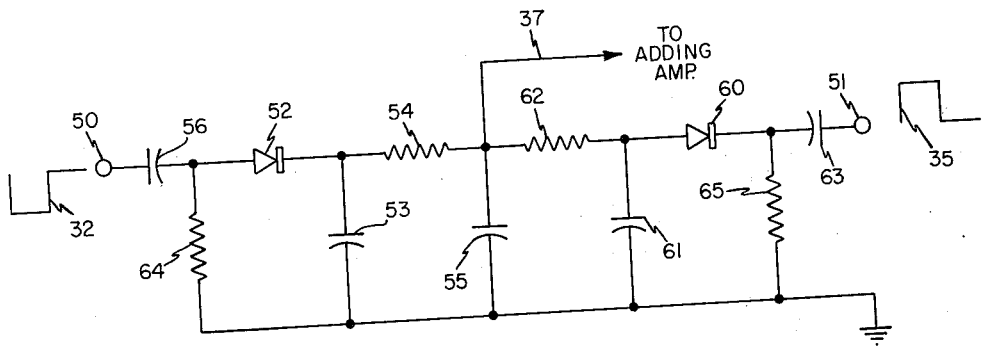
FIG. 4 is a schematic circuit diagram of a difference detector satisfactory for use in the block diagram of FIG. 1.

The circuit arrangements of FIGS. 1 and 4 are adapted to maintain resonance once that condition has been attained. However, it is quite possible that a condition of resonance will not be attained during circuit start-up so that the feedback control may operate; or in the alternative the feedback control will be unable to maintain control after start-up due to extreme transient conditions.

Accordingly, FIG. 5 discloses a first preferred embodiment of a resonant seeking circuit 70 that is advantageously adapted for use with the circuit arrangement of FIGS. 1 and 4. Resonance seeking circuit 70 is associated with the circuit diagram of FIG. 1 by opening conductor 37 and inserting resistor 71 in series with this conductor. The right terminal end of resistor 71 is directly connected to the adding amplifier 40, and also to the control grid of cathode-follower tube 72.

When the circuit arrangement of Fig. 1 is operating at resonance, the error signal applied to the conductor 37 is substantially zero. However, in the event that the resonance condition is lost, bistable multivibrator 31 applies a constant positive output to the differential detector 36 inasmuch as a resonance pulse 29 is required to reverse the condition of multivibrator 31. Accordingly, a large positive error signal is applied to conductor 37 by differential detector 36. This error signal charges feedback capacitor 73 to a large positive value so that the voltage appearing across cathode resistor 74 triggers thyratron tube 75 through grid resistor 76. Battery 77 normally biases thyratron 75 to a nonconducting condition.

Relay 78 is operated in response to plate current conduction in thyratron 75, thereby closing normally open contacts 78a and 78b. The closure of contact 78a applies plate voltage to thyratron tube 79 through an energizing circuit that includes the winding of relay 80. Thyratron tube 79 remains in a nonconducting condition, however, inasmuch as a cutoff negative bias voltage is applied to the grid thereof by a circuit that includes grid resistor 81.

The closure of normally open contact 78b in response to the flow of operating current through the winding of relay 78 applies a negative voltage through potentiometer 82 to capacitor 73. Capacitor 73 charges slowly through potentiometer 82, and the feedback voltage across the capacitor gradually decreases to zero and becomes negative. At some point during the charge of voltage across capacitor 73, frequency control 41 drives radio-frequency oscillator 18 to the resonance frequency.

The grid of thyratron 79 is connected to the output of audio-amplifier 21 through a grid resistor 83. Accordingly, the positive signal obtained at resonance fires thyratron 79, thereby operating relay 80. The operation of relay 80 opens normally closed contact 80a thereby causing relay 78 to release contacts 78a and 78b to their normally open position. The grid of thyratron 75 now assumes a substantially zero potential and therefore thyratron 75 remains nonconducting and the feedback network regains control. This control is normally maintained as previously set forth with reference to FIG. 1; however, during extreme transient circuit conditions, the feedback network may lose resonance so that the resonance seeking circuit 70 is again operated as just described.

An alternative and simpler circuit arrangement for accomplishing resonance seeking is shown in FIG. 6. This circuit embodiment is applied to the apparatus of FIG. 1 by opening conductor 37 and connecting resistors 90 and 91 serially relative conductor 37. The error output signal from differential detector 36 is applied to the left terminal of resistor 90, and a drive signal for adding amplifier 40 is obtained from the right terminal of resistor 91.

During normal conditions of circuit operation in FIG. 1, the error output signal from differential detector 36 is substantially near zero voltage. When resonance is lost, the resulting positive error signal is applied to neon gas tube 92 through resistor 90, and the negative bias of battery 93 applied to neon gas tube 92 through resistor 94 is overcome thus discharging feedback capacitor 95. The potential of terminal 96 is thus lowered to a negative value determined by the bias voltage of battery 93.

Gas tube 92 extinguishes immediately upon firing and therefore feedback capacitor 95 charges slowly in a positive direction. The voltage variations appearing at terminal 96 are filtered by resistor 91 and capacitor 97 so that relatively smooth voltage charges are applied to adding amplifier 40. When the voltage across capacitor 97 brings radio-frequency oscillator 18 to the resonance frequency, the resonance seeking circuit of FIG. 6 ceases operation, inasmuch as a substantially zero output voltage is applied to conductor 37 by differential detector 36.

It should be understood that the above described arrangements are merely illustrative of the principles of this invention and that numerous other modifications may be provided without departing from the scope of the invention.

What is claimed is:

1. Nuclear magnetic resonance measuring apparatus comprising means generating a radio-frequency field, means generating a steady magnetic field that is amplitude modulated so that the relationship $W=\gamma H$ is periodically attained for the nucleus under test, means generating a resonance pulse for each occurrence of nuclear resonance, means generating a first square wave having a time length equal to and coinciding with the start and end of one alternation of each modulation cycle, means actuated by said resonance pulse for generating a second square wave having a time length equal to and coinciding with the start of said alternation and the occurrence of resonance during a middle time portion of each modulation cycle equal to one-half of the modulation cycle, said square waves both being of the same amplitude, and means responsive to any differences in said square waves for varying the frequency of said radio-frequency means until both of said square waves are of equal time length.

2. Nuclear magnetic resonance measuring apparatus comprising means generating a radio-frequency field, means generating a steady magnetic field that is amplitude modulated so that the relationship $W=\gamma H$ is periodically attained for the nucleus under test, means generating a resonance pulse for each occurrence of nuclear resonance, a monostable multivibrator generating a first square wave having a time length equal to and coinciding with the start and end of one alternation of each modulation cycle, a bistable multivibrator actuated by said resonance pulse generating a second square wave having a time length equal to and coinciding with the start of said alternation and the occurrence of resonance during a middle time portion of each modulation cycle equal to one-half of the modulation cycle, said square waves both being of the same amplitude, and means including a difference detector responsive to any integrated differences in said square waves for varying the frequency of said radio-frequency means until both of said square waves are of equal time length.

3. Nuclear magnetic resonance measuring apparatus comprising means generating a radio-frequency field, means generating a steady magnetic field that is amplitude modulated so that the relationship $W=\gamma H$ is periodically attained for the nucleus under test, means generating a resonance pulse for each occurrence of nuclear resonance, means generating a first square wave having a time length equal to and coinciding with the start and end of one alternation of each modulation cycle, means actuated by said resonance pulse generating a second square wave having a time length equal to and coinciding with the start of said alternation and the occurrence of resonance during a middle time portion of each modulation cycle equal to one-half of the modulation cycle, said square waves both being of the same amplitude, means responsive to any differences in said square waves for varying the frequency of said radio-frequency means until both of said square waves are of equal time length, and resonance seeking means actuating said radio-frequency generating means through a range of frequencies to attain resonance in response to a loss of resonance.

4. Nuclear magnetic resonance measuring apparatus comprising means generating a radio-frequency field, means generating a steady magnetic field that is amplitude modulated so that the relationship $W=\gamma H$ is periodically attained for the nucleus under test, means generating a resonance pulse for each occurrence of nuclear resonance, a monostable multivibrator generating a first square wave having a time length equal to and coinciding with the start and end of one alternation of each modulation cycle, a bistable multivibrator actuated by said resonance pulse generating a second square wave having a time length equal to and coinciding with the start of said alternation and the occurrence of resonance during a middle time portion of each modulation cycle equal to one-half of the modulation cycle, said square waves both being of the same amplitude, means including a difference detector responsive to any integrated differences in said square waves for varying the frequency of said radio-frequency means until both of said square waves are of equal time length, and resonance seeking means actuating said radio-frequency generating means through a range of frequencies to attain a condition of resonance, and means responsive to a condition of resonance for rendering said resonance seeking means inoperative.

5. Nuclear magnetic resonance measuring apparatus comprising means generating a radio-frequency field, means generating a steady magnetic field that is amplitude modulated so that the relationship $W=\gamma H$ is periodically attained for the nucleus under test, means generating a resonance pulse for each occurrence of nuclear resonance, a monostable multivibrator generating a first square wave having a time length equal to and coinciding with the start and end of one alternation of each modulation cycle, a bistable multivibrator generating a second square wave having a time length equal to and coinciding with the start of said alternation and the occurrence of resonance during a middle time portion of each modulation cycle equal to one-half of the modulation cycle, said square waves both being of the same amplitude, means including a difference detector responsive to any integrated differences in said square waves for varying the frequency of said radio-frequency means until both of said square waves are of equal time length, and resonance seeking means operated by the integrated output signal of said difference detector in response to a non-resonance condition to actuate said radio-frequency generating means through a range of frequencies to attain a condition of resonance.

6. In nuclear magnetic resonance measuring apparatus having means generating a radio-frequency field and means generating a steady magnetic field that is amplitude modulated so that the relationship $W=\gamma H$ is periodically attained for the nucleus under test, the improvement comprising resonance seeking means sweeping the output frequency of said radio-frequency generating means to locate a condition of resonance in said apparatus, means for terminating the output frequency sweep of the resonance seeking means in response to the occurrence of the resonance phenomenon, means determining the time at which the located condition of resonance occurs with reference to the start of a modulation cycle of the otherwise steady magnetic field, and means actuated by said time determining means to vary further the frequency of said radio-frequency means to attain a predetermined time relationship between the occurrence of resonance and the start of a modulation cycle.

7. In nuclear magnetic resonance measuring apparatus having means generating a radio-frequency field and means generating a steady magnetic field that is amplitude modulated so that the relationship $W=\gamma H$ is periodically attained for the nucleus under test, the improvement comprising resonance seeking means sweeping the output frequency of said radio-frequency generating means to locate a condition of resonance in said apparatus, means for terminating the output frequency sweep of the resonance seeking means in response to the occurrence of the resonance phenomenon, means determining the time at which the located condition of resonance occurs with reference to the start of a modulation cycle of the otherwise steady magnetic field, and means actuated by said time determining means to vary further the frequency of said radio-frequency means to attain a predetermined time relationship between the occurrence of resonance and the start of a modulation cycle in which said predetermined time relationship is equal to one-half of the period of the modulation cycle.

References Cited in the file of this patent

UNITED STATES PATENTS

| | | |
|---|---|---|
| 2,772,391 | Mackey | Nov. 27, 1956 |
| 2,837,649 | Hershberger | June 3, 1958 |
| 2,912,641 | Ruble | Nov. 10, 1959 |
| 2,922,947 | Bloom et al. | Jan. 26, 1960 |

FOREIGN PATENTS

| | | |
|---|---|---|
| 745,873 | Great Britain | Mar. 7, 1956 |
| 746,114 | Great Britain | Mar. 7, 1956 |

OTHER REFERENCES

Nolle et al.: Review of Scientific Instruments, vol. 28, No. 11, November 1957, pp. 930–932.

Zimmerman et al.: Physical Review, Aug. 4, 1949, pp. 350 to 357.

Pound et al.: The Review of Scientific Instruments, vol. 21, No. 3, March 1950, pp. 219 to 225.